No. 785,384. PATENTED MAR. 21, 1905.
F. W. STEINACKER & I. CULVER.
CASH REGISTER.
APPLICATION FILED JULY 14, 1904.

6 SHEETS—SHEET 1.

WITNESSES:
C. R. Brown
D. Holmes

INVENTORS:
F. W. Steinacker & Ira Culver
BY
Fouts & Hull
ATTORNEYS

WITNESSES:
INVENTORS
F. W. Steinacker & Ira Culver
BY
Fouts & Hull
ATTORNEYS

No. 785,384. PATENTED MAR. 21, 1905.
F. W. STEINACKER & I. CULVER.
CASH REGISTER.
APPLICATION FILED JULY 14, 1904.

6 SHEETS—SHEET 3.

WITNESSES:
C. R. Brown
D. Holmes

INVENTORS:
F. W. Steinacker & Ira Culver
BY
Fouts & Hull
ATTORNEYS.

No. 785,384. PATENTED MAR. 21, 1905.
F. W. STEINACKER & I. CULVER.
CASH REGISTER.
APPLICATION FILED JULY 14, 1904.

6 SHEETS—SHEET 4.

WITNESSES:
C. R. Brown
D. Holmes

INVENTORS:
F. W. Steinacker & Ira Culver
BY Fouts & Hull
ATTORNEYS.

No. 785,384. PATENTED MAR. 21, 1905.
F. W. STEINACKER & I. CULVER.
CASH REGISTER.
APPLICATION FILED JULY 14, 1904.

6 SHEETS—SHEET 5.

WITNESSES:
C. R. Brown
D. Holmes

INVENTORS:
F. W. Steinacker & Ira Culver
BY Fouts & Hull
ATTORNEYS.

No. 785,384. PATENTED MAR. 21, 1905.
F. W. STEINACKER & I. CULVER.
CASH REGISTER.
APPLICATION FILED JULY 14, 1904.
6 SHEETS—SHEET 6.
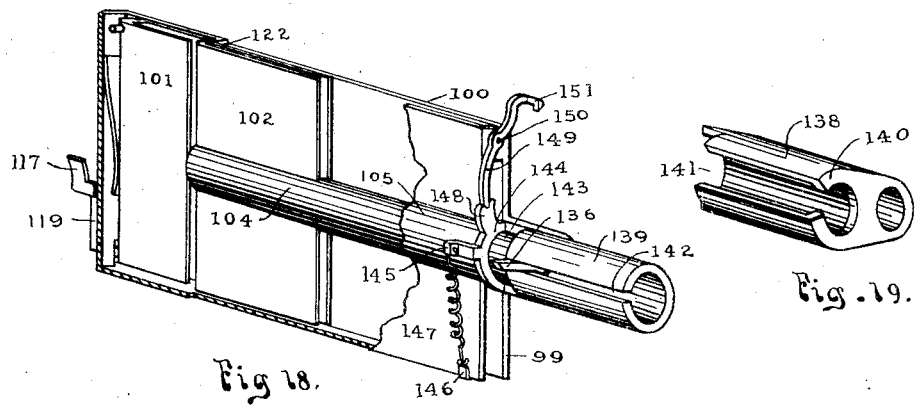
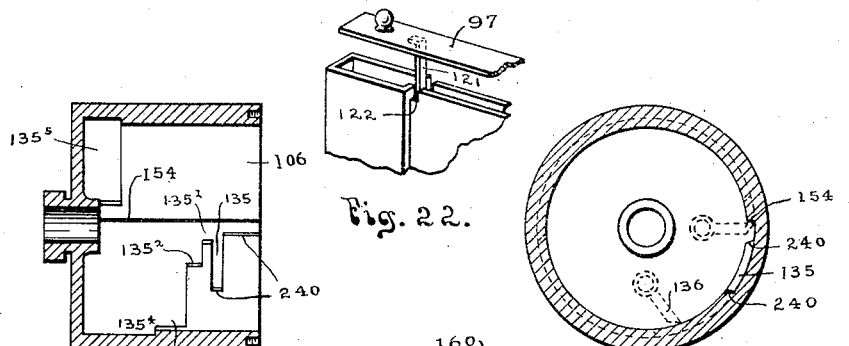
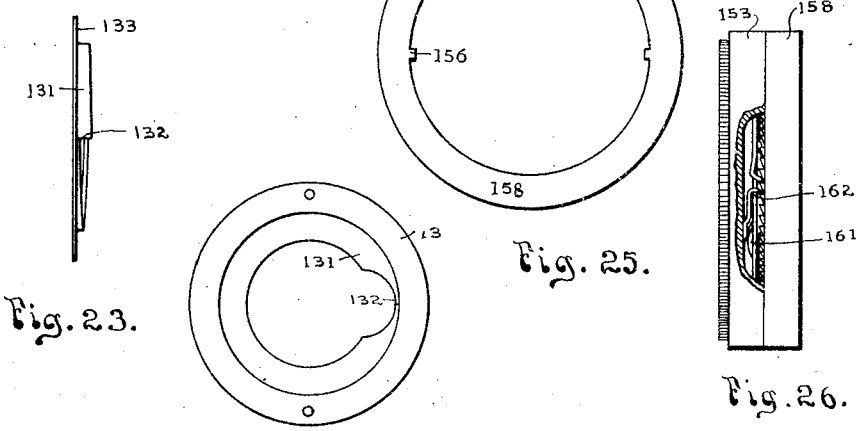
WITNESSES: INVENTORS:
F. W. Steinacker & Ira Culver
BY
Fonts & Hull
ATTORNEYS.

No. 785,384. Patented March 21, 1905.

UNITED STATES PATENT OFFICE.

FRANK W. STEINACKER AND IRA CULVER, OF CLEVELAND, OHIO.

CASH-REGISTER.

SPECIFICATION forming part of Letters Patent No. 785,384, dated March 21, 1905.

Application filed July 14, 1904. Serial No. 216,457.

*To all whom it may concern:*

Be it known that we, FRANK W. STEINACKER and IRA CULVER, residing at Cleveland, in the county of Cuyahoga and State of Ohio, have invented a certain new and useful Improvement in Cash-Registers, of which the following is a full, clear, and exact description, reference being had to the accompanying drawings.

Our invention relates to cash-registers, and generally to those which are adapted for the reception and distribution of coins.

Among the objects of the invention is the construction of a machine of this character which will depend for its operation upon the grasping of a coin at two opposite portions of the same, the register being normally locked, so as to prevent its operation until a coin is inserted within the same and is grasped at its opposite portions. While these portions will generally be diametrically opposite portions, it is within the province of our invention to grasp other opposite portions of said coin.

Generally speaking, the invention may be defined as consisting of the combinations of elements embodied in the claims hereto appended.

Figure 1:
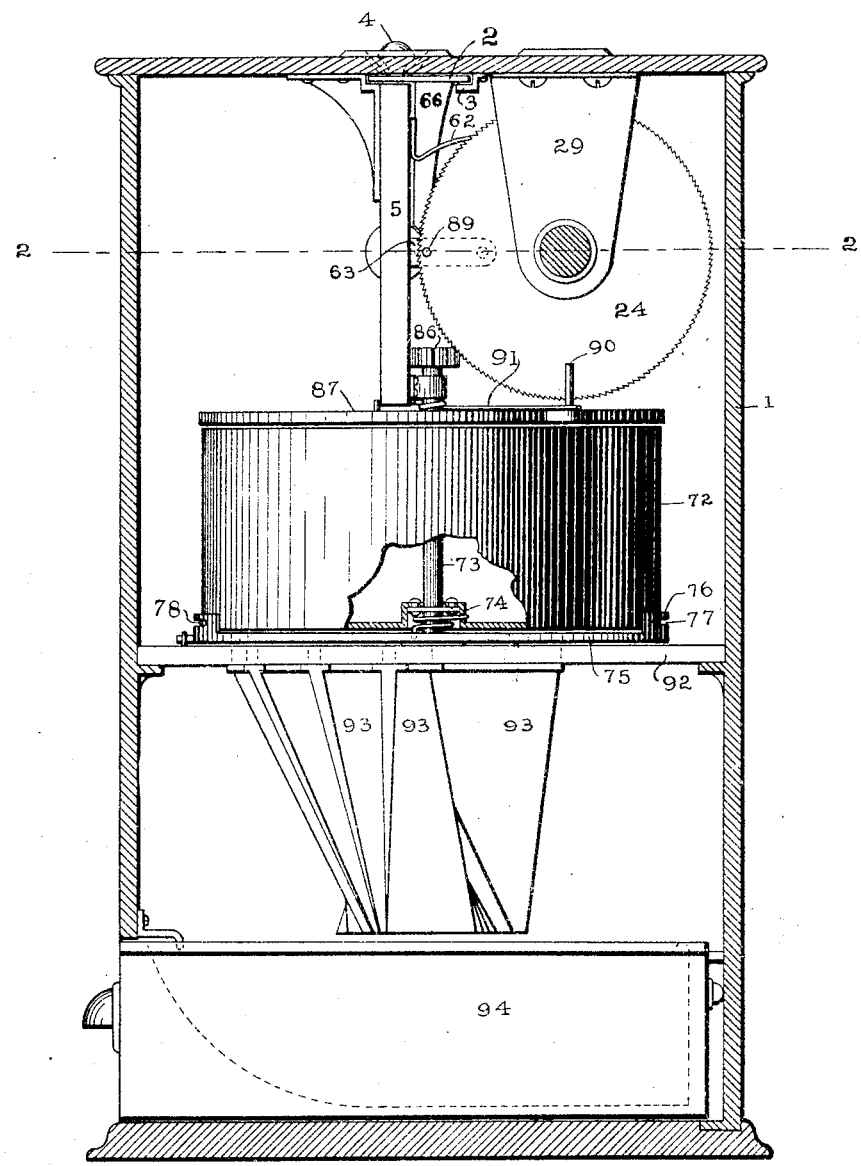
Figures 2, 3:
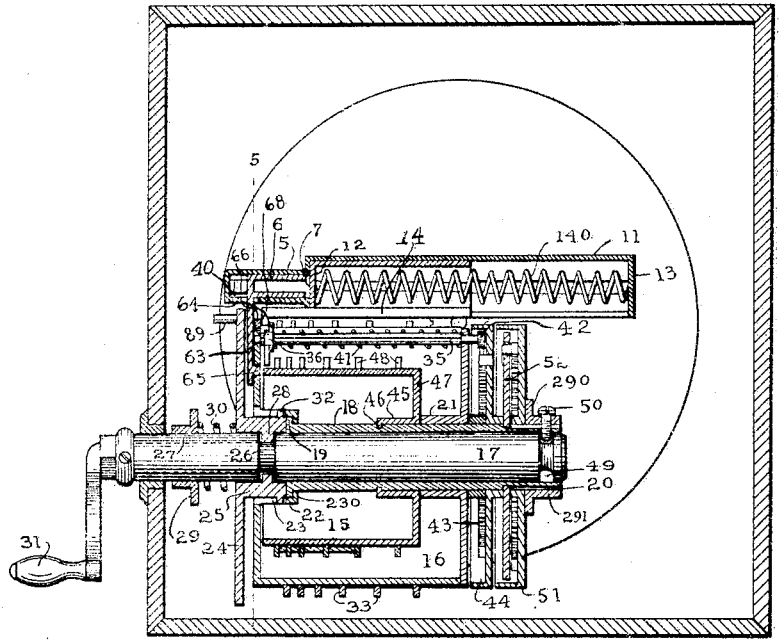
Figure 4:
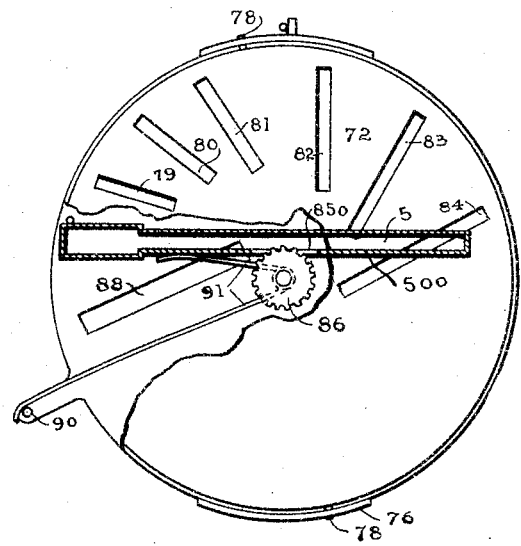
Figure 5:
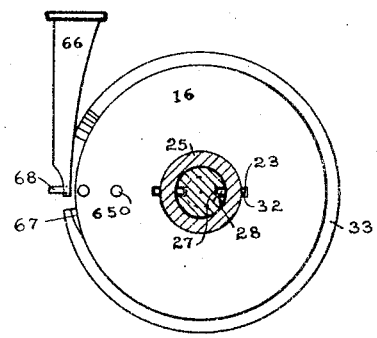
Figure 27:
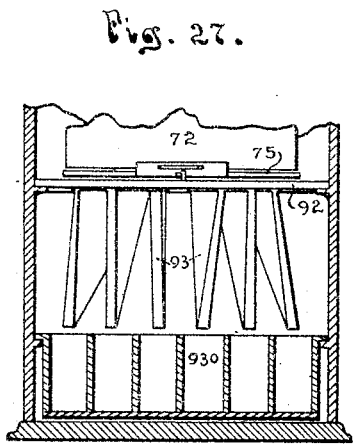
Figure 6:
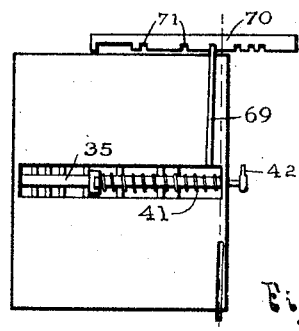
Figure 7:
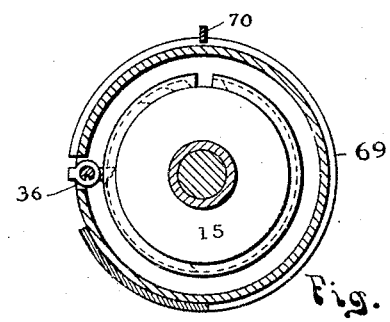
Figure 9:
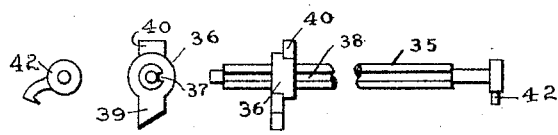
Figure 8:
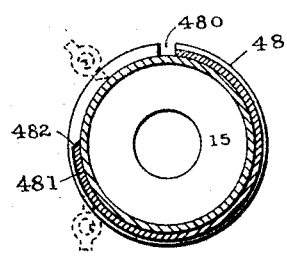
Figure 8A:
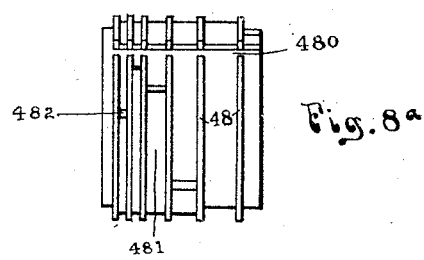
Figure 10:
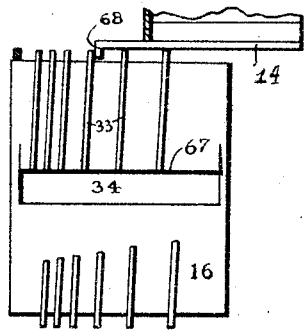
Figure 11:
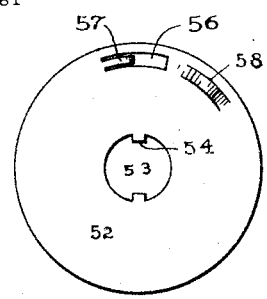
Figure 12:
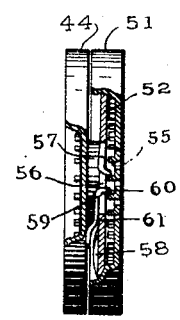
Figure 13:
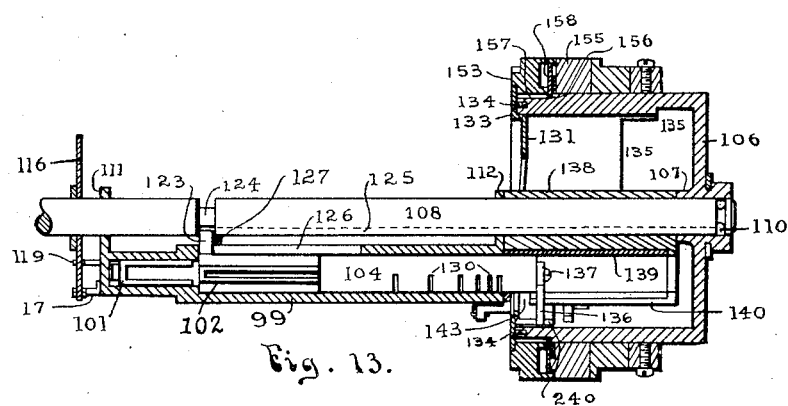
Figure 14:
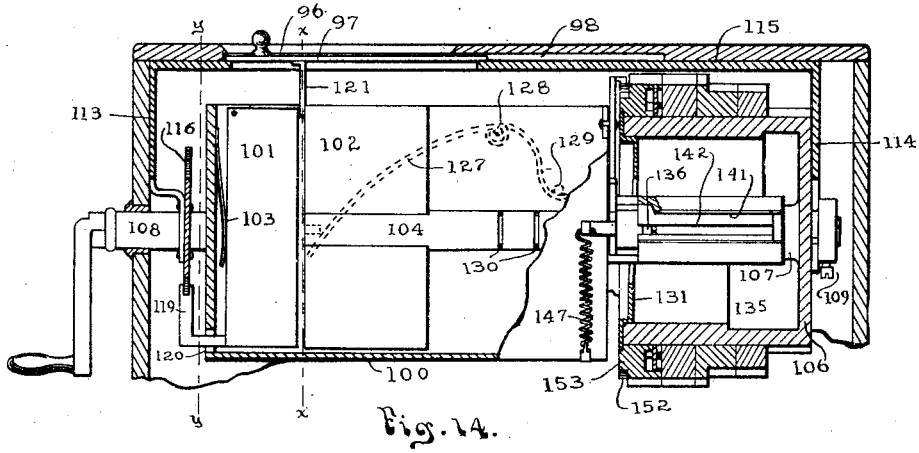
Figures 15, 16:
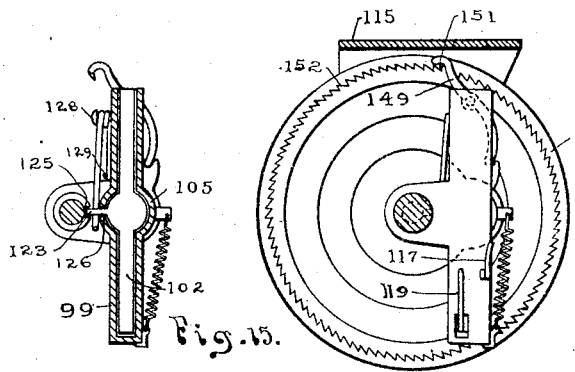
Figure 17:
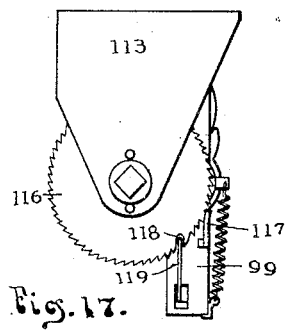

Referring to the drawings, Figure 1 represents an elevation of one form of our apparatus, certain parts being shown in section. Fig. 2 represents a horizontal sectional view on the line 2 2 of Fig. 1. Fig. 3 represents a detail view of the coin receptacle or chute employed in the apparatus shown in the preceding figures. Fig. 4 is a plan view, partly in section, showing the coin-distributing means. Fig. 5 represents a sectional view on the line 5 5 of Fig. 2. Fig. 6 represents an elevation of a modification of a portion of the devices shown in Fig. 1. Fig. 7 represents a cross-sectional view of the apparatus shown in Fig. 6. Figs. 8 and $8^a$ are respectively sectional and elevational details of the inner drum shown in Fig. 1. Fig. 9 represents details of the register-operating lever. Fig. 10 is a view similar to Fig. 6 of the outer drum and coacting parts employed with the apparatus shown in Fig. 1. Figs. 11 and 12 are details showing the transfer mechanism employed with both of the preceding forms of our invention. Fig. 13 represents a longitudinal section of another form of register embodying our invention. Fig. 14 represents a similar section taken at right angles to Fig. 13. Fig. 15 represents a vertical section through the coin chute or receptacle on the line $x\,x$ of Fig. 14. Fig. 16 represents a similar view taken on the line $y\,y$ of said figure, showing the registering mechanism in elevation. Fig. 17 represents an end elevation of the apparatus shown in Fig. 14, the outer casing being removed. Fig. 18 represents a perspective view, with parts broken away, of the coin chute or receptacle shown in Figs. 13 and 14. Fig. 19 represents a perspective detail of a portion of the differential mechanism. Figs. 20 and 21 are respectively a longitudinal and a transverse sectional view of the differential drum employed with this form of our invention. Fig. 22 represents one of the locking devices employed with our invention. Figs. 23 and 24 are respectively a side and a front elevation of our drawback or actuating mechanism for releasing the coins from the chute. Fig. 25 is an elevation of the transfer-ring employed with the third form of our invention. Fig. 26 is a view in side elevation, with parts broken away, showing such transfer mechanism; and Fig. 27 is an elevation of the coin-distributing mechanism shown in Fig. 1.

In all the embodiments of our invention there are present a casing, a chute or receptacle for coins in which they may be retained until the registering mechanism is set in operation, the registering mechanism proper, differential mechanism whereby the registration of coins of different value is automatically effected, means for releasing the coins from the chute or receptacle after the registering mechanism has been set in operation, and means for locking the register against operation until a coin has been inserted into the chute or receptacle and there measured or grasped between opposing members.

In the form of our invention embodied in Fig. 1, 1 represents the casing, said casing being, as shown in Figs. 1 and 2, of square or rectangular section and of sufficient depth to receive the registering and distributing mechanism. In the top of the casing there is a slide 2, fitted in guides 3 and having a knob or operating-handle 4. Immediately below the knob 4 is the coin receptacle or chute 5. This chute is of the form shown more particularly in Fig. 3 and consists of a casing 500, within which are located two members 6 and 7. The former of these members is pivoted to the casing near the upper outer end thereof by means of a pin 8. Between said member and the outer end of the casing is placed a spring 9. The member 7 is mounted to slide within the casing of the chute or receptacle, as by means of a barrel 10, about midway of its height, fitting slidably within a similar barrel 11, formed with the casing. Between the head 12 of the barrel 10 and the head 13 of the barrel 11 there is provided a spring 140. Rigid with the member 7 and projecting therefrom through a suitable slot in the casing is a member 14, the purpose of which will be hereinafter described. The outer end of the member 6 constitutes an abutment for one edge of a coin inserted into the chute or receptacle 5. The distance between this abutment and the adjacent portion of the sliding member 7 should be less than the diameter of the smallest coin which is to be used in the register, so that the diameters of all coins will be measured thereby. At one side of the chute is located the registering mechanism. This mechanism in the first two species of our invention comprises generally an inner drum 15 and an outer drum 16, the outer drum carrying the register-wheels and the inner drum the differential mechanism. Extending through said drums is the shaft 17, and surrounding said shaft is a sleeve 18, having at one end a flange 19 and adjacent to the other end oppositely-located keyways 20. The outer drum 16 is provided with oppositely-extending journals 21 and 22, said journals surrounding the sleeve 18. The forward journal has oppositely-located keyways 23, extending from the front nearly to the rear thereof and is provided with a flange 230, engaging the flange 19 of the sleeve 18 to prevent endwise movement of the outer drum. Surrounding the shaft there is a clutch-disk 24, having an inwardly-extending hub or sleeve 25 thereon. Intermediate of the ends of said sleeve the shaft is provided with an annular cut-out portion 26, and extending from said portion toward the front of the casing are the slots or keyways 27. A pair of oppositely-extending lugs 28 from said sleeve 25 extend into the cut-out portion of the shaft. Between the hanger 29 and the disk 24 there is a spring 30. Outside the casing the shaft is provided with an operating-handle 31. A pair of outwardly-extending lugs 32 from the sleeve 25 project into the slots or keyways 23 in the sleeve 22 of the outer drum. The drum 16 is provided on the outside thereof with a plurality of spiral ribs 33, said ribs extending the greater part of the distance around said drum and having their ends separated, as shown in Fig. 10. Adjacent to what may be termed the "starting ends" of said ribs there is a slot 34. Extending the length of the drum and journaled in the opposite heads thereof a suitable distance within the periphery of said drum is the shaft 35. This shaft is provided with a sliding sleeve 36, said sleeve having an inwardly-projecting lug 37, engaging a keyway 38 in the shaft 35. Projecting downwardly from said sleeve there is a beveled lug 39, while projecting upwardly from the same there is a shoulder 40. (See Fig. 9.) Surrounding said shaft and extending between the sleeve 36 and the rear head of said drum and secured at its ends to said sleeve and drum there is a spring 41. The rear end of the shaft is reduced and journaled in the rear head of the drum and is extended beyond said head and there provided with a pawl 42, which engages the teeth 43 of the registering-wheel 44. The shaft and the lug 39 and pawl 42 constitute a bell-crank lever for operating the register-wheels. The inner drum 15 is provided with an elongated sleeve 45, having teeth or lugs 46 locking it to the sleeve 18. The rear end of said inner drum is provided with a head 47; but the front end thereof is preferably open, being substantially closed by the front head of the outer drum. On its outer periphery the inner drum is provided with a series of spiral ribs 48, the length of said ribs varying for a purpose to be hereinafter described. When the apparatus is not in operation, the beveled lug 39 extends between the first of these ribs and the adjacent head of the outer drum and projects nearly to the outer surface of the inner drum. The rear end of the shaft 17 and its surrounding sleeve 18 are supported in a hanger 290, similar to the hanger 29, the former hanger having a hub portion 291 surrounding said sleeve. To prevent the shaft from sliding in its sleeve, it is provided with an annular recess 49, into which projects a screw 50, extending through said hub and sleeve. On the sleeve 18 posterior to the wheel 44 is a second register-wheel 51. In order to transfer from the wheel 44 to the wheel 51, we employ therewith the transfer mechanism shown in Figs. 11 and 12. A disk 52, provided with a central opening 53, adapting it to be slid upon the sleeve 18, and with lugs 54 for fitting in the keyway 20 to lock it to said sleeve, fits within the wheel 51, covering the teeth 55, in the manner shown in Fig. 12. This disk is provided with an opening 56 near its periphery. Projecting through said opening and preferably formed as a tongue bent from said disk is a detent-pawl 57, engaging the teeth 55 to prevent the wheel 51 from being rotated backwardly. Adjacent to the opening 56 and on the side opposite the pawl 57 there is provided a boss or cam 58. Projecting from the wheel 44 is the pawl 59. This pawl is provided with a hook portion 60, adapted to engage the teeth 55, and with a portion 61 intermediate of the disk body and the hook, which will engage the projection or cam 58 on the disk 52. The location of the cam 58, the size of the opening 56, and the extent of the portion 61 of the pawl are such that the wheel 51 is moved one tooth before the cam 58 lifts the hook 60 out of engagement with the teeth of said wheel. It will thus be seen that for every revolution of the wheel 44 the wheel 51 is advanced one tooth. As many additional register-wheels as may be desired may be employed, depending upon the size of the register.

As devices of this character are apt to be tampered with more or less, we have provided several safeguards whereby it is practically impossible to operate our apparatus in a manner to actuate the register when no coins have been dropped into the chute or receptacle, to cause the registering mechanism to take less than a full stroke when once set in operation, or to otherwise cause the register to render an inaccurate account of the coins that have been dropped into the chute or receptacle.

In order to prevent the operation of the registering mechanism until a coin is actually inserted into the chute, we have provided the abutment 6 with an arm 63, extending through a slot 64 in the chute-casing, said arm being provided with a lug 65, engaging a hole 650 in the head of the outer drum adjacent thereto. When a coin has been inserted into the chute, the pressure of the spring 140 moves the abutment 6 against the action of its spring 9 toward the adjacent end of the casing and releases the lug 65 from the head of the outer drum.

To prevent the registering mechanism from taking less than a full stroke, we have, as will appear from an inspection of Fig. 1, serrated the periphery of the disk 24 and have provided the chute 5 with a detent-pawl 62 engaging such serrations, whereby when said disk is in engagement with said shaft the latter may not be rotated backwardly.

In order to prevent the operation of the outer drum and with it the registering mechanism by inserting a tool or wire into the chute and pressing the abutment to unlock the arm 63 from the drum-head, we have provided the sliding cover 2 with a leg 66, as shown in Fig. 5. Before operating the register the end of the leg 66 is at the outer end of the drum adjacent to the slot 34 between the ribs 33 thereon and can be moved back and forth within said slot. Adjacent to said slot the wall of the drum is thickened, as shown in Figs. 5 and 10, at 67, such thickened portion being of less height than the ribs 33 on the drum. Unless, therefore, the cover is in closed position, with the leg 66 between the end of the slot and the end of the drum, the drum cannot rotate, as the length of the leg 66 is such that it is engaged by the thickened part of the drum-wall. It will therefore be impossible to rotate said drum until the cover is closed, and in such case it will obviously be impossible to insert a tool or wire in the chute or receptacle to operate the abutment 6 and unlock the outer drum. The distance between the ribs 33 on the drum 34 corresponds to the differences in diameters between the various coins employed in the register. For instance, the first rib on the left corresponds to the dime. The cent, being somewhat greater in diameter than the dime, will have its rib the second one on said drum. The third rib represents a nickel; the fourth, a quarter; the fifth, a half-dollar; and the sixth, a dollar. The vertical faces of these ribs, which are toward the rear of the drum, will engage with the projecting portion 68 of the sliding member 7 when a dime, a cent, a nickel, a quarter, a half-dollar, and a dollar are inserted in said chute. As it is desirable to release the coins from the chute at a certain time after registration has been inaugurated, the ribs 33 extend spirally around the drum, whereby the rotation of the drum will cause a movement of the sliding member 7 away from the abutment to permit the coin to be released. If it were possible, however, to withdraw the detent 65 from its hole in the drum-head, this alone would not permit the operation of the registering mechanism, since until the clutch-disk 24 is moved a sufficient distance to the left, Fig. 2, the shaft will revolve idly with the lugs 28 in the annular slot in the same. The insertion of a coin within the chute, however, will cause the abutment 6 to be forced to the left a sufficient distance to clutch the drum and shaft together.

In order to cause the registering-wheels to be turned the proper distance to register the value of the coin inserted in the chute, we have devised the following construction: The ribs 48 on the inner stationary drum 15, as heretofore indicated, do not extend entirely around said drum. The position and number of these ribs correspond generally to that of the ribs 33 on the drum 16. It will be observed from an inspection of Fig. 2 that the foot 68, carried by the sliding member 7, engages the shoulder 40, projecting from the sleeve 36. Engaging the foot 68 is the leg 66, carried by the slide which covers the coin-chute. When said cover is moved, therefore, to permit the insertion of a coin into the chute, both the foot 68 and the sleeve 36 are moved at the same time. The position of the ribs 48 corresponding to that of the ribs 33 when a coin is in place in the chute the lower end of the beveled lug 39 is in the space 480 between a pair of ribs 48, its position being determined by the diameter of the coin in the chute. Between each pair of ribs there is placed a filler 481, the length of said filler varying inversely with the denomination of the coin whose value is to be registered. Referring specially to Figs. 8 and 8ª, the recess between the first two ribs and extending from the slot 480 between the ends of the ribs 48 to the shoulder 482 on the filler is sufficient to enable the register-wheel to be moved ten teeth before the beveled lug 39 is engaged by said shoulder to break the connection between the detent 42 and the register-wheel. The recess between the second and third ribs corresponds to the cent and is only long enough to permit the register-wheel to be moved one tooth before said lug is engaged, the recess between the third and fourth ribs corresponds to the nickel, the recess between the fourth and fifth ribs corresponds to the quarter, and so on. After striking the shoulder 482 further movement of the drum 16 causes the lug 39 to be carried on top of the filler until just before the parts are brought to the starting position, when said lug rides off of said filler into the slot 480 and the spring 41 rocks the shaft and brings the pawl 42 into engagement with a tooth of the wheel 44, ready for the next operation. At this time the lug 65 is snapped into place by the spring 9 to lock the register before the next operation. Meanwhile the corresponding rib 33 has operated the sliding member 7 to release the coin. Sufficient space is provided between the starting and release ends of the ribs 33 to permit the sliding member to return to its initial position under the pressure of the spring 140 before the revolution of the shaft is completed. The release ends of these ribs overlap each other progressively, as shown in Fig. 10, whereby there will be no interference with the return of the sliding member to its initial position by any of the ribs other than the one which is operating said member. By the arangement of the leg 66, projection 68, and shoulder 40 the opening of a chute to insert a coin will automatically carry the sliding member to a position to be engaged by its drawback and the register-wheel-operating mechanism to a position to be tripped when the value of the coin in the chute has been registered.

In Fig. 6 we have shown a modification of the means for operating the sliding member. In this instance we provide the outer drum 16 with a spiral rib or drawback 69, but provide the extension 70, which corresponds with extension 14 on the slide 7, with a plurality of slots 71, said slots being so located as to engage said rib or drawback when a coin has been inserted in the chute and grasped between the member 6 and 7. In Fig. 6 the extension 70 is shown in the position which it occupies when a quarter is in said chute, the drum having been given one-fourth of a revolution.

In both of the above modifications of our invention we may employ a coin-distributing device adapted to automatically send the coins to different compartments in a drawer. In Figs. 1 and 4, 72 represents a drum which is located in the casing below the chute 5. This drum is rotatably supported on a shaft 73, a spring 74, surrounding said shaft and connected with a fixed base-plate 75 and said drum, serving to bring said drum back to its initial position. The base-plate 75 is provided at each end with an upstanding flange 76, each of said flanges having therein a slot 77 and the drum being provided with pins 78, projecting into said slots. Extending through said drum is a plurality of vertical slots 79, 80, 81, 82, 83, and 84, said slots being of varying sizes to accommodate coins of different denominations. Thus the slot 79 will accommodate a dime, the slot 80 a cent, the slot 81 a nickel, and so on. These slots are so arranged that by rotating the drum each may be brought directly under that portion of the chute from which the coins are discharged. A rack 85 on the sliding member 7 engages, through a slot 850 in the casing, a pinion 86 on said drum and causes the drum to be rotated when the cover above the chute is withdrawn to insert a coin therein, and the distance between these slots is such that when a coin of a particular denomination has been inserted in the chute its corresponding slot in the drum is in register with said chute.

In order to prevent the discharge of a coin from the chute without a corresponding operation of the register, as by violently jarring the instrument, we interpose a plate 87 between said chute and said drum, said plate being imperforate except for a slot 88, which is large enough to accommodate the largest coin employed in the register. By means of a pin 89 on the disk 24 and a corresponding pin 90 on the plate 87 the plate is rotated, toward the latter part of the movement of the disk and of the registering mechanism, to bring the slot 88 beneath the chute and to permit the coin to drop through said slot into the corresponding slot in the drum therebelow. A spring 91 returns the plate to its cut-off position after the pins 89 and 90 have passed out of contact with each other.

A chute-carrying member 92 is placed below the drum 72, said member having a plurality of chutes 93 depending therefrom. Each of these chutes discharges into a separate compartment 930 in the drawer or till 94. By properly inclining the slots or passages through the drum the coin discharged into said slot or chute will be carried into its appropriate chute 93 and discharged therethrough into the proper compartment in the till or drawer 94.

In Figs. 13 to 26, inclusive, we have shown a form of our invention peculiarly adapted for use in connection with small savings-banks. In this embodiment of our invention we preserve the same general features of construction as in those hereinbefore described; but for compactness of construction we rotate the coin chute or receptacle to release the coin after registration has commenced. The casing is represented by the numeral 95 and has in the upper part thereof a slot 96, within which slides the cover 97, which cover when in the position shown in Fig. 14 closes the opening in the top of the casing. This cover slides in the guideway 98, formed in the outer part of the casing. Within the casing and below the slide 97 is located the chute or receptacle 99. Like the modification hereinbefore described, this chute 99 consists of a casing 100, having therein the abutment 101 and the sliding member 102. This abutment is pivoted at its upper outer corner to the casing in the same manner as is the abutment 6 and has between it and the outer end of the casing a spring 103. The sliding member 102 is provided with a central hub-like projection 104, sliding in a similar projection 105 on the casing. The chute when revolved is adapted by its movement to operate the registering mechanism, said chute being connected, by the insertion of a coin into the chute, with the operating-shaft and with the registering mechanism. The differential drum 106 is provided with an inwardly-extending sleeve 107, through which the shaft 108 extends, said shaft being normally free to rotote therein without corresponding rotation of the drum. Longitudinal movement of the shaft in said sleeve is prevented by means of the screw 109 extending through the sleeve and projecting into an annular recess 110 in said shaft. Extensions 111 and 112 from the front and rear of the casing 99, respectively, form bearings in which the shaft may turn when no coin is in the chute. Hangers 113 and 114, depending from the horizontal plate 115, which is secured to the top of the casing, support the shaft. Attached to the hanger 113 is a ratchet-wheel 116, having peripheral teeth therein which are engaged by the detent-pawl 117, (see Fig. 17,) carried by the front end of the chute, to prevent backward rotation of the shaft and consequent maloperation of the register. This ratchet-wheel has a notch 118, which when no coins are in the chute and when the device is in the starting position is engaged by the leg 119, carried by the abutment 101 and projecting through a slot 120 in the end of the chute. Depending from the slide 97 is a leg 121, which projects into the chute-casing in position to engage the front end of the sliding member 102. When a coin has been inserted into the chute, the slide must be closed to bring the end of the leg 121 into alinement with a slot 122 in the casing in order to permit the rotation of said chute. From the foregoing it will be seen that before the shaft may be rotated at all the slide must be in closed position and a coin must have been inserted into the chute to disengage the member 119 from the ratchet-wheel. As a further safeguard against the improper operation of the chute we provide the sliding member 102 with a lug 123, which when there is no coin in the chute extends into the cut-out portion 124 of the shaft 108. When a coin has been inserted into the chute, however, the consequent movement of the sliding member 102 throws the lug 123 into the slot or keyway 125 in the shaft and causes the chute to be splined to and rotated by means of the shaft, said lug projecting through a slot 126 in said casing 99. The movement of the sliding member is resisted by means of a spring 127, secured to pins 128 and 129 on the side of the casing adjacent to said shaft, the free end of said spring engaging the lug 123. As in the prior modification of our invention, the distance between the abutment 101 and the end of the sliding member adjacent thereto is less than the diameter of the smallest coin to be inserted into the chute, and the strength of the spring 127 is sufficiently greater than that of the spring 103 to cause the abutment to be moved toward the adjacent end of the casing when a coin is in the chute and unlock the leg 119 from the ratchet-wheel 116. As a means for releasing the coins from the chute we have provided the member 104 with a series of slots 130 and have placed in the front of the differential drum 106 the drawback member 131, said member being shown more particularly in Figs. 13, 23, and 24 as a spiral rib. The slots 130 are so located in the member 104 as to be engaged by the drawback member 131 when any of the coins of standard size are inserted in the chute. As will be seen from an inspection of said figures, the member 131 is provided with a cut-out portion 132, permitting the member 104 to slide freely therein when the cover 97 is withdrawn to insert a coin in the chute. As will further appear from said figures, especially Fig. 23, the pitch of this spiral is at the beginning of the first quarter-revolution of the chute very slight, but increases rapidly thereafter. By this construction the grip on the coin is not relaxed sufficiently to release the coin until the chute has made about three-eighths of a revolution. In actual operation the coin is released between three-eighths and five-eighths of a revolution of the chute, when the said chute is nearly inverted. The end of the spiral is provided with an abrupt shoulder 132, permitting the sliding member 102 to return to initial position as soon as the slot is disengaged from the highest portion of said spiral. The spiral rib proper is carried on a base-ring 133, which fits within the end of the differential drum, being secured thereto, as by screws 134. The interior of the drum 106 is provided with recesses of a length corresponding to the value of the coin which is in the chute. These slots or recesses are so located as to receive therein the beveled lug 136, secured to the end of a short shaft 137 in the end member 104 whenever coins of different denominations are inserted in the chute. Six of these slots or recesses 135, $135'$, $135^2$, $135^3$, $135^4$, and $135^5$ will ordinarily be provided, being respectively for a dime, a cent, a nickel, a half-dollar, and a dollar.

(See Fig. 20.) Between the hub 107 and the bearing 112 and inclosing the shaft 108 is the double sleeve 138. (See Fig. 19.) The portion of said sleeve opposite that which embraces the shaft is adapted to receive the sleeve 139, being provided with an inwardly-extending flange 140 to retain said inner sleeve in place and with a wide slot 141 for a purpose to be hereinafter described. The sleeve 139 is provided with a narrow slot 142, registering with a slot 141, the beveled lug 136 projecting through both of said slots. The sleeve 139 is provided with a cut-out portion at 143, said portion corresponding with the inner edge of the drawback member 131. Beyond said drawback member a ring 144 completes the sleeve 139, said ring being provided with a lug 145, between which and lug 146 on the casing 99 extends a spring 147. This ring is further provided with an upwardly-extending lug 148, which has a slotted portion receiving the lower end of a pawl 149, pivoted to the casing 99 at 150. The opposite end of the pawl is provided with a hook portion 151, which when the parts are in starting position engages a tooth 152 of a register-wheel 153. (See Figs. 16 and 18.) The lug 136, sleeve 139, ring 144, and lug 148 constitute, in effect, a bell-crank lever for operating the wheel 153. When a coin is inserted in the chute, the lug 136 is set into its proper recess or slot in the drum 106. The insertion of the coin in the slot not only positions the member 104 for engagement with the drawback 131 and releases the locking-lug 119 from the ratchet 116, but also connects the chute with the shaft 108. The shaft is then revolved and the chute is rotated. The lug 136 travels in its slot, said slot being of a length necessary to permit the pawl 151 to turn the register-wheel until said wheel registers the value of the coin in the chute. At this time the lug engages the appropriate shoulder 240 (see Fig. 21) and is thereupon partially rotated against the action of the spring 147. This movement of the lug rotates the sleeve 139, and with it the lug 148, to trip the pawl 151 out of engagement with the teeth of the register-wheel 153. The lug then travels in the position shown in dotted lines in Fig. 21 for the remainder of the rotation of the chute, being prevented from return to its initial position by the engagement of the drawback 131 with the appropriate slot of the member 104, the shoulder 154 being so positioned as to permit said lug to assume its normal position just as the chute finishes its rotation and the member 104 is released by the drawback. Meanwhile the drawback 131 engaging the proper slot 130 of the member 104 has when the chute is nearly inverted released the coin. While the shaft has been rotating the leg 119 has been traveling around on the outer face of the ratchet-wheel 116. When the revolution of the shaft has been completed, the spring 103 causes said leg to pass into its slot 118 to lock the shaft against further rotation. With the register-wheels I employ substantially the same transfer mechanism as is employed with the previous modification. On the drum 106 to the rear of the wheel 153 is the second register-wheel 155. Between said wheels, being fitted in place by means of internal lugs 156 engaging a keyway 157 on the drum, is the disk 158. This disk, like the disk 52, is provided with an opening 159, a detent-pawl 160, and a boss or cam 161. A pawl 162, projecting from the wheel 153, engages a tooth of the wheel 158 and moves said wheel a distance of one tooth, being thrown out of engagement by the boss or cam 161 at the end of such movement. It will be evident that as many additional register-wheels with similar mechanism may be employed as is desired. The register-wheels of this and the preceding modifications will be provided with figures indicating, preferably, the totals of the values of the coins inserted in the chute. A suitable sight-opening will be provided in the casing for the observation of such figures. If desired, a distributer may be employed with this last form of registering apparatus, said distributer being of any desirable form—as, for instance, a main distributing-chute having branch chutes leading therefrom of progressively-increasing size, whereby the smallest coin will pass into the smallest chute, the next smallest into the next chute, and so on.

While we have described our invention in detail, it will be obvious that such details may be departed from more or less without avoiding the spirit of our invention, and we do not propose to be limited to such details, except as such may be included in the claims hereto annexed or rendered necessary by the prior state of the art.

Having described our invention, we claim—

1. In a cash-register, the combination of registering mechanism, a receptacle for the money inserted into said register, means for releasing the money from said receptacle after registration has been inaugurated, said releasing means being maintained out of operative condition until money has been inserted into said receptacle and being placed in operative condition by the insertion of the money into said receptacle, substantially as specified.

2. In a cash-register, the combination of registering mechanism, a receptacle for the money inserted into said register, means for releasing the money from said receptacle after registration has been inaugurated, said means being maintained out of operative condition until money has been inserted into said receptacle and being placed in operative condition by the insertion and presence of money in said receptacle, and a common operating means for said registering mechanism and said releasing means, substantially as specified.

3. In a cash-register, the combination of registering mechanism, a receptacle for the money inserted into said register, means for releasing the money from said receptacle after registration has been inaugurated, means for maintaining said releasing means out of operative condition until money has been inserted into said receptacle, and means, dependent upon the presence of money in said receptacle, for placing said releasing means in operative condition, substantially as specified.

4. In a cash-register, the combination of registering mechanism, a receptacle for the money inserted into said register, means for releasing the money from said receptacle after registration has been inaugurated, means for maintaining said releasing means out of operative condition until money has been inserted into said receptacle, means, dependent upon the presence of money in said receptacle, for placing said releasing means in operative condition, and a common operating means for said registering mechanism and said retaining means, substantially as specified.

5. In a cash-register, the combination of registering mechanism, a receptacle for the money inserted into said register, means for releasing the money from said receptacle after registration has been inaugurated, means for locking said releasing means against operation until money has been inserted into said receptacle, and means, dependent upon the presence of money in said receptacle, for unlocking said releasing means, substantially as specified.

6. In a cash-register for coins, the combination of a receptacle for the coins, means for engaging opposite portions of the coins in said receptacle, means for registering the values of the coins inserted in said receptacle, means for releasing the coins from said receptacle, means for locking said mechanism and said releasing means against operation, and means for unlocking said mechanism and releasing means when a coin is so engaged.

7. In a cash-register for coins, the combination of a receptacle having an opening for the insertion of coins, a cover for the opening of said receptacle, mechanism for registering the values of the coins in said receptacle, and means for preventing the operation of the registering mechanism when the cover is in a position other than that which closes said opening.

8. In a cash-register for coins, the combination of a receptacle having an opening for the insertion of coins, a cover for the opening in said receptacle, mechanism for registering the values of the coins inserted into said receptacle, and means, carried by said receptacle, for preventing the operation of the registering mechanism except when the cover closes said opening.

9. In a cash-register, the combination of a coin-receptacle, mechanism for registering the value of a coin inserted therein, a shaft for operating said mechanism, a keyway in said shaft, a rotatable member having a projection for engaging said keyway, means for connecting said member and the registering mechanism, and means for throwing said projection into said keyway by the insertion of a coin into said receptacle.

10. In a cash-register for coins, the combination of a receptacle wherein coins are inserted, registering mechanism for said coins, means for releasing said coins from said receptacle after registration has been inaugurated, and operating mechanism for said releasing means, said operating mechanism being rendered effective by the presence of a coin in the receptacle.

11. In a cash-register for coins, the combination of a chute for the coins having therein an abutment and a sliding member between which the coins are inserted, means pressing said member and abutment toward each other to retain the coins in place, and means for moving one of said members to release the coins.

12. In a cash-register for coins, the combination of a receptacle for said coins having therein two members between which the coins are inserted, means for forcing one of said members toward the other to retain the coins in place, mechanism for registering the values of the coins, and means for moving one of said members in a direction to release the coins.

13. In a cash-register for coins, the combination of a receptacle for coins, an abutment and a sliding member in said receptable between which the coins are inserted, a spring pressing said member toward said abutment to retain the coins in place, registering mechanism, a shaft for operating said mechanism, and means driven by said shaft to actuate the sliding member against the action of said spring to release the coins after the registration has been started.

14. In a cash-register for coins, the combination of a receptacle, an abutment and a sliding member in said receptacle between which the coins are grasped, a shaft, registering mechanism operated by said shaft, means for forcing said sliding member in the direction of the abutment to retain the coins in the receptacle, and means, dependent upon the presence of a coin in the receptacle, for moving the sliding member away from the abutment to release the coins.

15. In a cash-register for coins, the combination of a receptacle, members in said receptacle between which the coins are grasped, one of said members being movable, registering mechanism, a rotating member for actuating said mechanism, and means, carried by said rotating member, engaging the movable member to operate it in a direction to release the coin.

16. In a cash-register for coins, the combination of a receptacle for the coins, registering mechanism, means for actuating the same, means for retaining the coins in said receptacle, means for releasing the coins from said receptacle and means, dependent upon the presence of a coin in said receptacle for operating such coin-releasing means only after the actuating mechanism has been moved a predetermined distance.

17. In a cash-register for coins, the combination of a receptacle for the coins, registering mechanism, means for actuating the same, means for locking together said receptacle and said actuating means, and means, dependent upon the presence of a coin in the receptacle, for releasing the locking means.

18. In a cash-register for coins, the combination of a receptacle for the coins, an abutment and a sliding member in said receptacle, said abutment and member being normally separated by a space less than the diameter of the smallest coin inserted in said receptacle, a spring resisting the movement of said abutment away from the sliding member, a stronger spring forcing the sliding member toward the abutment, registering mechanism, means for actuating the same, and means for locking together said abutment and said actuating means.

19. In a cash-register for coins, the combination of a receptacle, an abutment and a sliding member in said receptacle between which the coins are inserted, means pressing said sliding member toward said abutment to grip the coins in said receptacle, mechanism for registering the values of said coins, a shaft for actuating said mechanism, and means, operated by said shaft and engaging said sliding member, to move such member away from said abutment and release the coins after registration has beeen inaugurated.

20. In a cash-register for coins, the combination of a receptacle, an abutment and a sliding member in said receptacle between which the coins are inserted, means pressing said sliding member toward said abutment to grip the coins in said receptacle, mechanism for registering the values of said coins, a shaft for actuating said mechanism, an extension of said sliding member projecting beyond the casing of the receptacle, and means, operated by said shaft and engaging said extension, to move the sliding member away from the abutment to release the coin after registration is inaugurated.

21. In a cash-register for coins, the combination of a receptacle, an abutment and a sliding member within said receptacle between which the coins are inserted into said abutment, and mechanism, including a spiral or cam shaped rib, for engaging said sliding member to move it away from said abutment and release the coins.

22. In a cash-register for coins, the combination of a receptacle, means including a sliding member for retaining the coins in said receptacle, a rotating drum, and a rib carried by said drum and engaging said sliding member to operate in a direction to release the coins.

23. In a cash-register for coins, the combination of a receptacle, means including a sliding member in said receptacle for grasping said coins, a spring for forcing said member against said coins to retain the same in said receptacle, registering mechanism, said mechanism including a rotating drum having thereon a spiral or cam shaped rib engaging said sliding member to move the same against the action of the spring, and means for operating said drum.

24. In a cash-register for coins, the combination of a receptacle, means including a sliding member in said receptacle for grasping said coins, means for forcing said member against said coins to retain the same in said receptacle, registering mechanism, said mechanism including a rotating drum having thereon a spiral or cam shaped rib, an extension on said sliding member projecting beyond the receptacle and adapted, when a coin is in said receptacle, to engage said rib, and means for operating said drum.

25. In a cash-register for coins, the combination of a receptacle for the coins, mechanism for registering the value of the coin inserted in said receptacle, an abutment yieldingly supported in said receptacle and in position to engage a portion of a coin in said receptacle, means for operating the registering mechanism, a connection between said abutment and said operating means, and a member opposite said abutment engaging another portion of said coin and forcing said abutment in a direction to break the connection between the same and the operating means.

26. In a cash-register for coins, the combination of registering mechanism, operating mechanism therefor, a connection between said register and operating mechanism, and means, dependent upon the size of the coin inserted into the register, for breaking the connection between the registering and operating mechanisms when the value of such coin has been registered.

27. In a cash-register for coins, the combination of registering mechanism, operating mechanism therefor, a lever normally connecting said mechanisms, and means, dependent upon the size of the coin inserted into the register, for breaking the connection between the lever and the registering mechanism when the value of such coin has been registered.

28. In a cash-register for coins, the combination of registering mechanism, operating mechanism therefor, a bell-crank lever normally connecting said mechanisms, and means, dependent upon the size of the coin inserted into the register, for breaking the connection between said lever and said registering mechanism when the value of such coin has been registered.

29. In a cash-register for coins, the combination of a register-wheel, differential mechanism, means normally connecting said mechanism to said wheel, and means dependent upon the size of the coin inserted in said register, for breaking such connection when the wheel has registered the value of such coin.

30. In a cash-register for coins, the combination of a register-wheel, differential mechanism, a lever normally connecting said wheel and mechanism, and means, dependent upon the size of the coin inserted in the register, for breaking the connection between the lever and the register-wheel when said wheel has registered the value of such coin.

31. In a cash-register for coins, the combination of a register-wheel, differential mechanism, a bell-crank lever normally connecting said mechanism and wheel, and means, dependent upon the size of the coin inserted in the register, for breaking the connection between the lever and the wheel when the latter has registered the value of such coin.

32. In a cash-register for coins, the combination of a register-wheel, a differential drum, means normally connecting said drum and said register-wheel, and means, dependent upon the size of the coin inserted in said register, for breaking such connection.

33. In a cash-register for coins, the combination of a register-wheel, a differential drum, a lever normally connecting said drum and said register-wheel, and means, dependent upon the size of the coin inserted in said register, for breaking the connection between said lever and said wheel.

34. In a cash-register for coins, the combination of a register-wheel, a differential drum, a bell-crank lever normally connecting said drum and said wheel, and means, dependent upon the size of the coin inserted in said register, for breaking the connection between said lever and said wheel.

35. In a cash-register for coins, the combination of a register-wheel, a lever having an arm connected with said wheel, and a differential drum having its surface provided with elevated portions and recessed portions coöperating with said lever to trip the same and break the connection between said lever and the register-wheel when the value of a coin has been registered.

36. In a cash-register for coins, the combination of a register-wheel, a lever having one arm connected to the wheel to operate the same, a differential drum having its surface provided with elevations and recesses, said recesses being of a length corresponding to the value of a coin inserted in the register, means, dependent on the size of said coin, for placing the opposite arm of the lever in the appropriate recess, and means for rotating said wheel and lever with respect to said drum.

37. In a cash-register for coins, the combination of registering mechanism, a common receptacle wherein all coins are inserted into the register, a receiver for said coins, said receiver having therein compartments for coins of different denominations, a plurality of chutes leading to said compartments, a cut-off device interposed between the common receptacle and the individual chutes, and means, dependent upon the size of the coin in the common receptacle, for operating said cut-off to permit the passage of the coin from the common receptacle into the appropriate individual chute, after the operation of the registering mechanism has been started.

38. In a cash-register for coins, the combination of registering mechanism, a common receptacle wherein all the coins are inserted into the register, a receiver for said coins, said receiver having compartments for coins of different denominations, an individual chute leading to each of said compartments, a cut-off device between the common receptacle and the individual chutes, said device having therein chutes or passages for all coins, said chutes or passages being normally out of alinement with the common receptacle, and means, dependent upon the size of the coin in the common receptacle, for setting said plate to bring the appropriate slot therethrough in alinement with the common receptacle, after the operation of the registering mechanism has been started.

39. In a cash-register for coins, the combination of registering mechanism, a common receptacle for all coins inserted into the register, a plurality of compartments, one for coins of each denomination, a plurality of individual chutes, one for each of said compartments, a member having therethrough a plurality of channels or chutes, one for each of said individual chutes, means for normally holding said member with its channels or chutes out of alinement with the individual chutes, and means dependent upon the size of the coin inserted in the common receptacle, for operating said member to bring the channels or chutes therein into alinement with the appropriate individual chute, after the operation of the registering mechanism has been started.

40. In a cash-register for coins, the combination of a common chute for all coins inserted into said register, registering mechanism, means for operating said mechanism, a plurality of compartments, one for coins of each denomination, an individual chute for each of said compartments, a cut-off device interposed between the common and the individual chutes, and a connection between said device and said operating means whereby the cut-off device is moved to permit the passage thereby of a coin after the operation of the registering mechanism has been started.

41. In a cash-register for coins, the combination of a plurality of compartments, one for each denomination of coin, a common chute into which all coins are inserted, an individual chute leading to each of said compartments, a cut-off member interposed between said common and individual chutes, said cut-off member being provided with channels or chutes extending therethrough and normally out of alinement with said common and individual chutes, means dependent upon the presence of a coin in the common chute for setting said cut-off member to bring a channel or chute therethrough in alinement with the common and the individual chutes, and additional means for cutting off the communication between said common and individual chutes until registration has been started.

42. In a cash-register for coins, the combination of registering mechanism, a plurality of compartments, one for coins of each denomination, an individual chute for each of said compartments, a common chute within the register into which all coins are inserted, a rotary drum interposed between said common and individual chutes, said drum having passages or chutes extending therethrough and corresponding to the individual chutes, means for holding said drum with its passages or chutes out of alinement with the individual chutes until after registration has been started, and means, engaging opposite portions of a coin inserted in the common chute, for rotating said drum to bring its passages and the individual chutes into alinement.

In testimony whereof we affix our signatures in the presence of two witnesses.

FRANK W. STEINACKER.
  IRA CULVER.

Witnesses:
 ROBERT M. CALFEE,
 J. B. HULL.